(12) United States Patent
Channa

(10) Patent No.: US 10,447,552 B2
(45) Date of Patent: Oct. 15, 2019

(54) SYSTEM AND METHOD FOR PREDICTIVE MAINTENANCE

(71) Applicants: Kabushiki Kaisha Toshiba, Minato-ku (JP); Toshiba TEC Kabushiki Kaisha, Shinagawa-ku (JP)

(72) Inventor: Jonathan Channa, Rancho Cucamonga, CA (US)

(73) Assignees: Kabushiki Kaisha Toshiba, Minato-ku (JP); Toshiba TEC Kabushiki Kaisha, Shinagawa-ku (JP)

( * ) Notice: Subject to any disclaimer, the term of this patent is extended or adjusted under 35 U.S.C. 154(b) by 296 days.

(21) Appl. No.: 15/440,241

(22) Filed: Feb. 23, 2017

(65) Prior Publication Data
US 2018/0241637 A1 Aug. 23, 2018

(51) Int. Cl.
- G06F 15/16 (2006.01)
- H04L 12/24 (2006.01)
- H04N 1/00 (2006.01)
- H04N 1/32 (2006.01)

(52) U.S. Cl.
CPC ........ *H04L 41/147* (2013.01); *H04L 41/0213* (2013.01); *H04L 41/046* (2013.01); *H04N 1/00217* (2013.01); *H04N 1/00323* (2013.01); *H04N 1/00344* (2013.01); *H04N 1/32122* (2013.01); *H04N 1/32523* (2013.01); *H04N 2201/0094* (2013.01); *H04N 2201/3202* (2013.01)

(58) Field of Classification Search
USPC ........................................................ 709/217
See application file for complete search history.

(56) References Cited

U.S. PATENT DOCUMENTS

| | | | | |
|---|---|---|---|---|
| 6,219,151 B1 * | 4/2001 | Manglapus | ......... | H04L 41/0213 358/1.13 |
| 6,678,068 B1 * | 1/2004 | Richter | ................. | G06F 3/1204 358/1.1 |
| 6,941,367 B2 * | 9/2005 | Vosseler | .............. | H04L 41/0631 709/223 |
| 7,352,483 B2 * | 4/2008 | Osanai | ............... | G03G 15/5075 358/1.15 |

(Continued)

OTHER PUBLICATIONS

Bergman et al., RFC 2707: Job Monitoring MIB—V1.0, Nov. 1999, Internet Engineering Task Force, p. 1-114. (Year: 1999).*

*Primary Examiner* — Alicia Baturay
(74) *Attorney, Agent, or Firm* — Ulmer & Berne LLP

(57) ABSTRACT

A system and method for predictive maintenance of multi-function peripherals includes a data collection agent configured to receive and store simple network management protocol (SNMP) data including metered data from one or more multifunction peripherals, and a service prediction system configured to selectively perform linear regression analysis on one or more of the metered data to predict one or more service events for at least one multifunction peripheral based on the linear regression analysis. Notifications for each predicted service event are sent to service technicians associated with the associated multifunction peripheral. Service technicians can preemptively perform service and maintenance functions on the multifunctional peripherals before error or faults occur on the multifunction peripherals.

19 Claims, 5 Drawing Sheets

(56) References Cited

U.S. PATENT DOCUMENTS

| | | | |
|---|---|---|---|
| 7,359,969 B2* | 4/2008 | Motoyama | G06Q 10/10 707/999.104 |
| 7,620,718 B2* | 11/2009 | Motoyama | G06Q 10/10 709/219 |
| 7,664,555 B2* | 2/2010 | Kawai | H04N 1/00204 358/1.13 |
| 7,885,551 B2* | 2/2011 | Matsuura | G03G 15/502 399/23 |
| 7,885,940 B2* | 2/2011 | Hegde | H04L 43/103 707/687 |
| 8,019,794 B2* | 9/2011 | Pathak | G06F 8/60 707/604 |
| 8,135,622 B2* | 3/2012 | Inoue | G06Q 30/0601 705/26.1 |
| 8,332,054 B2* | 12/2012 | Kawai | H04N 1/00204 700/1 |
| 8,412,816 B2* | 4/2013 | Jreij | G06F 11/0784 709/224 |
| 8,438,273 B2* | 5/2013 | Motoyama | H04L 41/022 709/206 |
| 8,553,244 B2* | 10/2013 | Ohashi | G06F 3/1207 358/1.14 |
| 9,046,854 B2* | 6/2015 | Yang | G03G 15/556 |
| 9,134,675 B2* | 9/2015 | Yang | G03G 15/556 |
| 9,836,253 B2* | 12/2017 | Tomono | G06F 3/121 |
| 2003/0126240 A1* | 7/2003 | Vosseler | G06F 11/0709 709/221 |
| 2004/0156064 A1* | 8/2004 | Owen | G06F 3/1204 358/1.13 |
| 2005/0102362 A1* | 5/2005 | Price | G06Q 10/107 709/206 |
| 2008/0162839 A1* | 7/2008 | Nakamichi | G06F 3/0607 711/159 |
| 2008/0243328 A1* | 10/2008 | Yu | G05B 23/0232 701/31.2 |
| 2014/0178084 A1* | 6/2014 | Kuo | G03G 15/55 399/38 |
| 2018/0240022 A1* | 8/2018 | Channa | G06F 3/1203 |
| 2019/0056900 A1* | 2/2019 | Channa | G06F 3/1293 |

* cited by examiner

SYSTEM AND METHOD FOR PREDICTIVE MAINTENANCE

TECHNICAL FIELD

This application relates generally to a system and method for predictive maintenance of document processing devices. The application relates more particularly to analyzing multifunction peripherals (MFPs) using the simple network management protocol (SNMP) to predict when maintenance and other services need to be performed.

BACKGROUND

Document processing devices include printers, copiers, scanners, fax machines, and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the aforenoted functions. It is further understood that any suitable document processing device can be used.

Given the expense in obtaining and maintain MFPs, MFPs are frequently shared by users and monitored by technicians via a data network. MFPs can be monitored using the Simple Network Management Protocol (SNMP). Using SNMP, fault conditions and other conditions requiring service by a technician can be detected. However, it generally takes a short period of time for a service technician to travel to the location of the MFP to perform services or repair. If a service technician notices a potential problem with the MFP that may require additional service in the future, the service technician may not have the parts on hand to perform the service, requiring the service technician to return to the MFP at a future time to perform the service. However, multiple service calls to the same MFP is generally not an efficient use of time for service personnel.

SUMMARY

In accordance with an example embodiment of the subject application, a system includes a data collection agent and a service prediction system. The data collection agent and the service prediction system can be processes executing on a common platform, such as a multifunction peripheral device, a network server, one or more of a plurality of network servers, and a third party cloud service platform. The data collection agent is configured to receive simple network management protocol (SNMP) data from one or more document processing devices. The SNMP data includes metered data such as a count of printed pages, a count of printed color pages, toner level, and paper cartridge levels among other possible metered data. The data collection agent stores the SNMP data and the service prediction system accesses the SNMP data, for example by performing a search on a search and query language (SQL) database, and performs linear regression analysis on the metered data to predict at least one service or maintenance event for the document processing device. The service prediction system can store the predicted service event and also send a notification about the predicted service event to a user associated with the document processing device, such as information technology (IT) personnel or remote service technicians which can be selected by the service prediction system based on the type of predicted service event. The notification can include a predicted time associated with the service prediction. The service prediction system can receive a response from the user in response to the notification. The service prediction system can perform the linear regression analysis when there is sufficient metered data to perform the linear regression analysis, for example after monitoring metered data for a particular document processing device for a period of days or weeks. Example predicted service events can include a low toner event, a low paper event, a scheduled maintenance of a component of the document processing device, a request to preemptively replace a component of the document processing device prior to failure of the component, and an inspection request for a component of the document processing device.

BRIEF DESCRIPTION OF THE DRAWINGS

Various embodiments will become better understood with regard to the following description, appended claims and accompanying drawings wherein:

DETAILED DESCRIPTION

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Throughout this disclosure, various terms such as maintenance, service, preventative maintenance, repair, replacement of consumables, and other similar terms are used, and can be used interchangeably where suitable.

Figure 1:
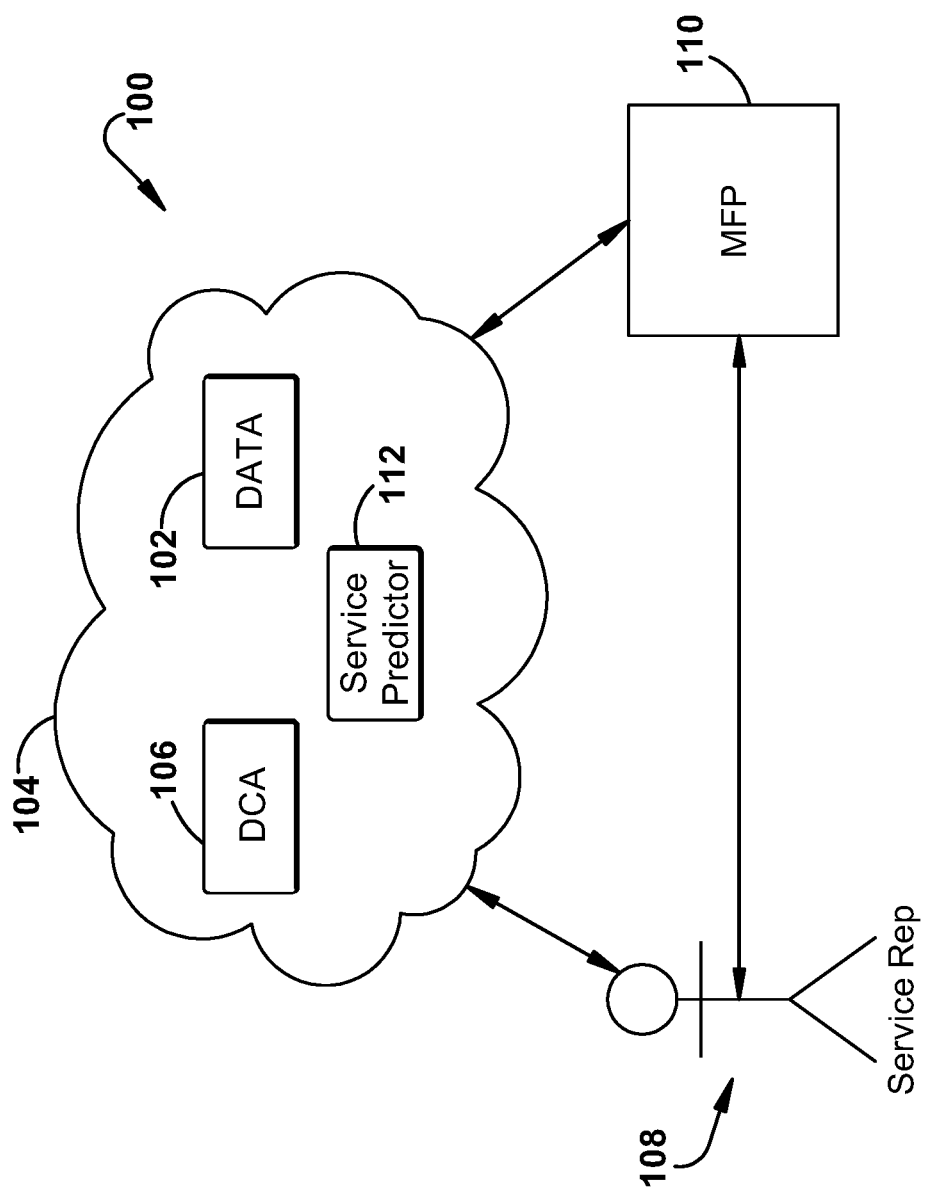
FIG. 1 is a system overview diagram of a system for predictive maintenance of an MFP according to an embodiment of the disclosure.

Referring now to FIG. 1, a system 100 for predictive maintenance includes a data collection agent or DCA 106, a service prediction system 112, and a data store 102, all of which can reside in a network 104 or more generally in the cloud. The DCA 106 and service prediction system 112 communicate with one or more multifunction peripherals or MFPs 110 over the network 104, such as a wired or wireless local area network, a wide area network, the Internet, or any suitable network as would be understood in the art. The DCA 106 can be an MFP executing E-Bridge Cloud Connect. The service prediction system 112 can be a separate server, a process executing on a device such as an MFP, or a network service provided by a third party service provider as would be understood in the art. The service prediction system 112 can be part of a platform executing E-Bridge Cloud Connect.

In the system 100, the DCA 106 receives SNMP data from the MFP 110, for example by polling the MFP 110 or by receiving autonomous SNMP messages from the MFP 110. The SNMP data can include object identifiers, or OIDs, associated with the number of pages printed by the MFP 110, counters, page counts, paper levels, toner levels, faults and error messages, and so forth. The DCA can store the received SNMP data in the data store which can be local memory, cloud storage, or any suitable data store as would be understood in the art. The service prediction system 112 predicts future maintenance and service needs for the MFP 110 as described below and sends suitable alerts to a service technician 108 responsible for service and maintenance of the MFP 110.

Figure 2:
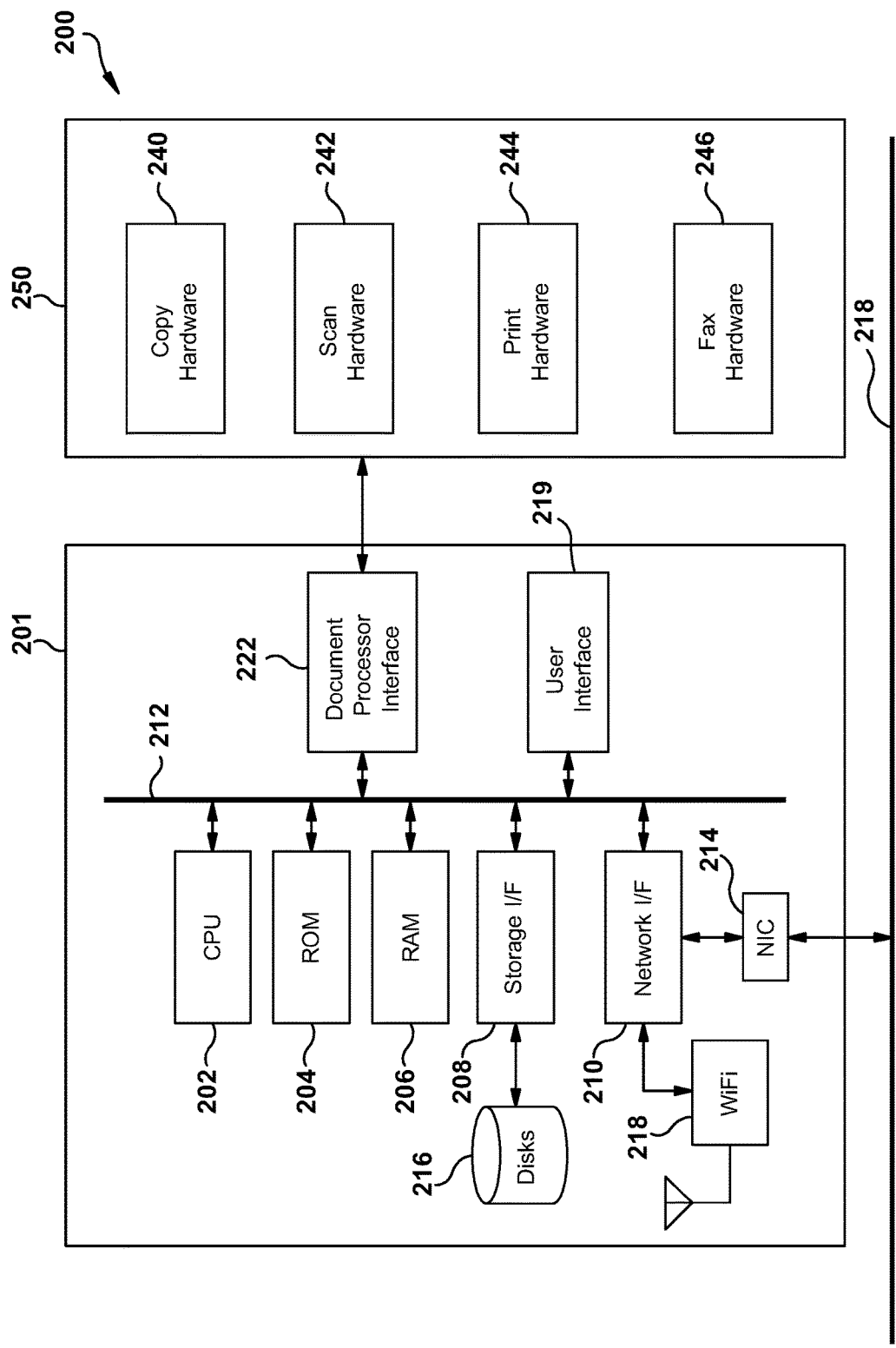
FIG. 2 is a diagram of example components of a multifunction peripheral according to an embodiment of the disclosure.

Turning now to FIG. 2, illustrated is an example embodiment of a document rendering system 200 suitably comprised within an MFP, such as with MFP 110 of FIG. 1. Included in controller 201 are one or more processors, such as that illustrated by processor 202. Each processor is suitably associated with non-volatile memory, such as ROM 204, and random access memory (RAM) 206, via a data bus 212. Processor 202 is also in data communication with a storage interface 208 for reading or writing to a storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection 218 or to a wireless data connection via wireless network interface 220. Example wireless connections include cellular, Wi-Fi, BLUETOOTH, NFC, wireless universal serial bus (wireless USB), satellite, and the like. Example wired interfaces include Ethernet, USB, IEEE 1394 (FireWire), LIGHTNING, telephone line, or the like.

Processor 202 can also be in data communication with any suitable user input/output (I/O) interface 219 which provides data communication with user peripherals, such as displays, keyboards, mice, track balls, touchscreens, or the like. Also in data communication with data bus 212 is a document processor interface 222 suitable for data communication with MFP functional units 250. In the illustrate example, these units include copy hardware 240, scan hardware 242, print hardware 244 and fax hardware 246 which together comprise MFP functional hardware 250. It will be understood that functional units are suitably comprised of intelligent units, including any suitable hardware or software platform.

Figure 3:
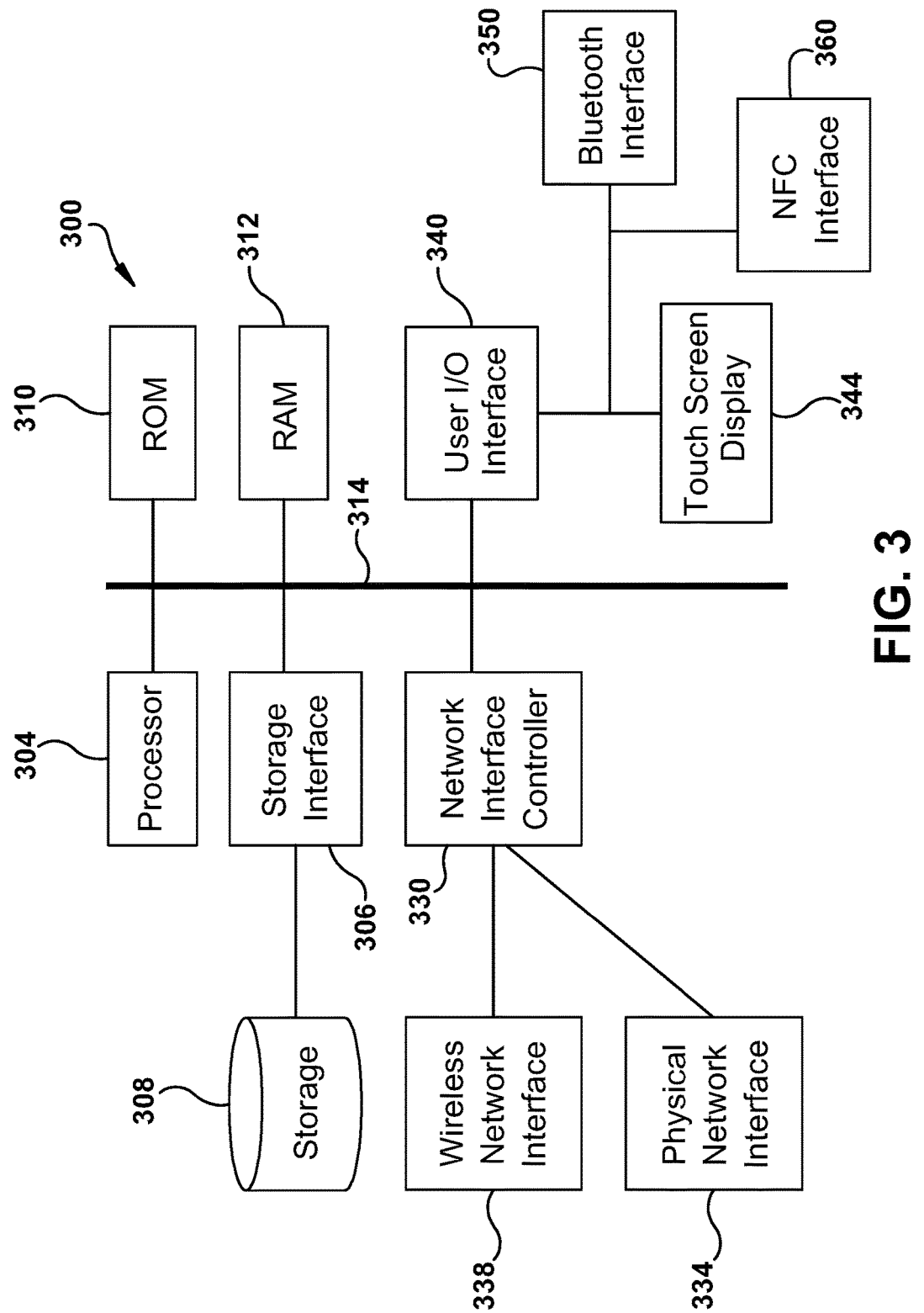
FIG. 3 is a diagram of example components of a computing device according to an embodiment of the disclosure.

Turning now to FIG. 3, illustrated is an example embodiment 300 of a processing system such as the DCA 102, and the service prediction system 106. This architecture is also suitably implemented in a document processing device such as an MFP controller of the MFP 110. Included are one or more processors, such as that illustrated by processor 304. Each processor is suitably associated with non-volatile memory, such as read only memory (ROM) 310 and random access memory (RAM) 312, via a data bus 314.

Processor 304 is also in data communication with a storage interface 316 for reading or writing to a data storage system 318, suitably comprised of a hard disk, optical disk, solid-state disk, or any other suitable data storage as will be appreciated by one of ordinary skill in the art.

Processor 304 is also in data communication with a network interface controller (NIC) 330, which provides a data path to any suitable wired or physical network connection via physical network interface 334, or to any suitable wireless data connection via wireless network interface 338, such as one or more of the networks detailed above.

Processor 304 is also in data communication with a user input/output (I/O) interface 340 which provides data communication with user peripherals, such as display 344, as well as keyboard 350, mouse 360 or any other interface, such as track balls, touchscreens, or the like. It will be understood that functional units are suitably comprised of intelligent units, including any suitable hardware or software platform.

Figure 4:
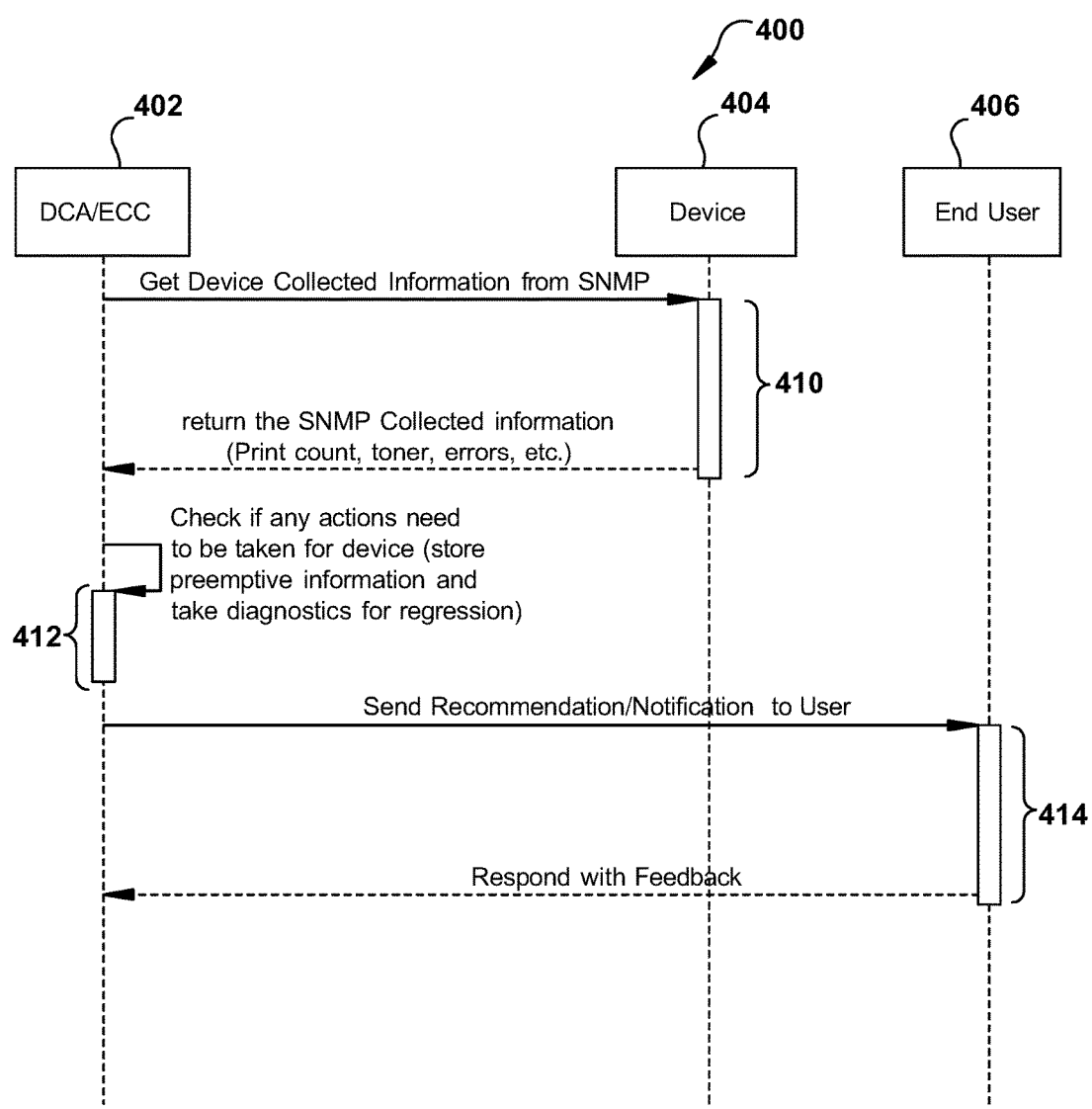
FIG. 4 is a flow diagram of example operations of a Data Collection Agent (DCA) and maintenance predictor according to an embodiment of the disclosure.

Referring now to FIG. 4, example operations of the predictive maintenance system 400 are presented. In step 410, a DCA/ECC system 402 can retrieve SNMP data from devices 404 such as MFP 110 of FIG. 1. The SNMP data can include object identifiers, or OIDs, associated with various metered data of the devices, such as the number of pages printed by a device 404, counters associated with components of or actions performed by the device 404, page counts, paper levels, toner levels, faults and error messages, and other data as would be understood in the art. The DCA/ECC system 402 can store the SNMP data to local or cloud storage. The retrieving and storing operations can continue in a loop. In step 410, the DCA/ECC system 402 can analyze the SNMP data from a device 404, for example using linear regression analysis, and determine if any preemptive actions need to be taken, such as alerting a user 406 of a predicted future condition of a device 404. The user 406 can respond to the alert, for example to accept responsibility for performing preemptive actions by a specified time or data. The DCA/ECC system 402 can store preemptive data and perform diagnostics of the devices 404 for regression analysis.

Linear regression can be used to analyze various metered data from devices that is available for analysis. For example, if SNMP data is collected for a period of time from a device, linear regression analysis can be used to determine trends for each device and typical usage rates. Errors and faults on the devices can be logged and linear regression analysis can be used to determine correlations between the amounts of usage and conditions, errors or faults that occur based on the amounts of usage. Based on the linear regression analysis and current metered data, a prediction of a future error, fault, or maintenance requirement can be determined and sent to a user or service technician. For example, linear regression analysis can determine that toner typically needs to be replaced in a multifunction printer after a certain number of pages. Based on the current page count, a service request for toner replacement can be sent for a predicted time or date for replacement of the toner cartridge.

Figure 5:
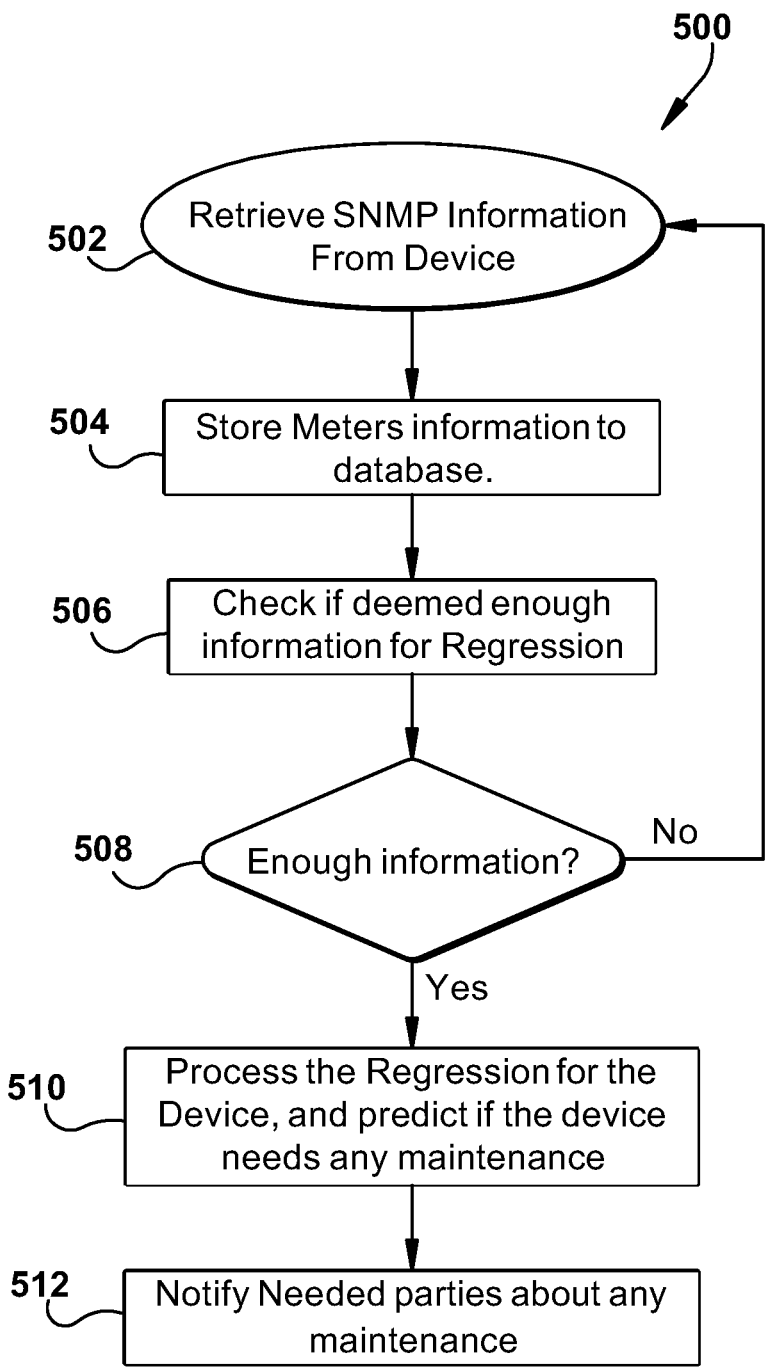
FIG. 5 is a flow diagram of example operations for predictively determining maintenance. according to an embodiment of the disclosure.

Referring now to FIG. 5, example operations 500 for predictively determining maintenance and service requirements of a document processing device are presented. At step 502, SNMP data is retrieved from a document processing device such as an MFP. At step 504, the SNMP data is stored in a database, for example local storage, networked storage, cloud storage, or a search and query language (SQL) server. The SNMP data can include meter data such as toner level, page count, paper levels, and so forth as previously described. At step 506, a check is performed to determine if sufficient meter data is available to perform a linear regression analysis. For example, after gathering meter data for several hours, days, and/or weeks it is possible to determine page print rates, toner usage rate, and so forth for various periods of time such as days, weeks, days of the week, weekdays, weekends, months, and so forth. At step 508, if there is sufficient meter data for performing the linear regression analysis, then processing continues to step 510, otherwise processing continues back to step 502 to continue gathering SNMP data from devices. At step 510, linear regression analysis is performed on the SNMP data and predicted maintenance and service events are determined. At step 512, notifications are sent to one or more users regarding the predicted maintenance and service events. The notifications can be sent via any suitable messaging platform, for example email, instant messaging, calendar requests, or a proprietary system as would be understood in the art. Different users can receive different notifications. For example, IT professionals local to the devices can receive notifications for toner or paper replacement, while remote service technicians can receive notifications for scheduling service calls to repair, replace, or inspect of components of devices.

In a first example, if the linear regression analysis of SNMP data for a device predicts that toner will need to be replaced in a printer within a certain period of time, a notification can be sent to an information technology (IT) professional of the company where the printer is located to replace the toner cartridge by a specified time and/or date. In another example, if linear regression analysis of the SNMP data predicts that service of a particular part of a multifunction printer is likely, then a message can be sent to a service technician along with a prediction of the probable date of failure of the part. The service technician can then take proactive measures, such as obtaining necessary parts and scheduling a service call for the affected multifunction printer. Alerts can be request to replace parts or components of a document processing device, perform maintenance actions on parts or components of the document processing device, or inspect parts or components of the document processing device. Alerts can also include predictions of when paper in various paper trays may run out and need to be refilled, and other similar routine maintenance functions performed in the ordinary use and maintenance of document processing devices. Advantageously, the proposed linear regression analysis facilitates providing advanced notice of future predicted events so that service personnel can maximize the utility of their service calls, schedule their time more efficiently, avoid having to make subsequent service calls for maintenance that can be performed contemporaneously, and reduce service outages for document processing devices by proactively taking care of potential problems before they occur.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A system comprising:
   a data collection agent including a processor, a memory, and a network interface, configured to
      receive simple network management protocol (SNMP) data including metered data and device fault data from a document processing device over the network interface,
      store the received SNMP data; and
   a service prediction system configured to access stored SNMP data,
      perform linear regression analysis on metered data and device fault data of the SNMP data,
      determine at least one service event out of a plurality of service events for the document processing device based on the linear regression analysis,
      determine at least one component out of a plurality of components corresponding to the at least one service event, and
      predict a time to servicing a determined component for at the least one determined service event.

2. The system of claim 1, wherein the service prediction system is further configured to
   store a predicted service event for the document processing device, and
   send a notification about the predicted service event to a user associated with the document processing device.

3. The system of claim 2, wherein the user is a service technician and wherein the service prediction system is further configured to
   receive a response from the service technician in response to the notification.

4. The system of claim 3, wherein the service prediction system selects a user to which to send the notification based upon the type of predicted service event, and wherein the user is selected from the group consisting of an information technology user local to the document processing device, and a remote service technician.

5. The system of claim 2, wherein the service prediction system is further configured to
   analyze the metered data, and
   perform linear regression analysis on at least one metered data only when there is sufficient metered data to perform the linear regression analysis.

6. The system of claim 2, wherein the notification includes the predicted service event and a predicted time of the predicted service event.

7. The system of claim 1, wherein each predicted service event is selected from the group consisting of a scheduled maintenance of a component of the document processing device, a request to preemptively replace a component of the document processing device prior to failure of the component, and an inspection request for a component of the document processing device.

8. The system of claim 1, wherein the data collection agent and the service prediction system are processes executing on a common platform, and wherein the platform is selected from the group consisting of a multifunction peripheral device, a network server, one or more of a plurality of network servers, and a third party cloud service platform.

9. The system of claim 1, wherein the metered data is selected from the group consisting of a count of printed pages, a count of printed color pages, a toner level, and a paper cartridge level.

10. A method comprising:
    receiving device data including metered data and device fault data from a document processing device;
    storing the received device data;
    analyzing metered data and device fault data of the device data;

performing a linear regression analysis on the device data;
determining at least one service event out of a plurality of service events for the document processing device based on the analyzing of the device data;
determining at least one component out of a plurality of components corresponding to the at least one service event; and
predicting a time to servicing a determined component for the at least one service event.

11. The method of claim 10, further comprising:
storing the at least one predicted service event for the document processing device; and
sending a notification about each stored predicted service event to a user associated with the document processing device.

12. The method of claim 11, further comprising:
receiving a response from the user, the user being a service technician, in response to the notification.

13. The method of claim 11, wherein the user to which the notification is sent is selected based upon the type of predicted service event, and wherein the user is selected from the group consisting of an information technology user local to the document processing device, and a remote service technician.

14. The method of claim 11, wherein the notification includes the predicted service event and a predicted time of the predicted service event.

15. The method of claim 10, wherein the metered data is selected from the group consisting of a count of printed pages, a count of printed color pages, a toner level, and a paper cartridge level.

16. A document processing device, comprising:
a device controller including a processor and memory; and
a network interface,
wherein the processor is configured to
receive device data including metered data and device fault data from a second document processing device via the network interface,
save metered data and device fault data to a database,
perform linear regression analysis on stored metered data and device fault data,
determine at least one service event out of a plurality of service events for the second document processing device based on the linear regression analysis,
determine at least one component out of a plurality of components corresponding to the at least one service event, and
predict a time to servicing a determined component for the at least one determined service event.

17. The document processing device of claim 16, wherein linear regression analysis is performed on at least one metered data only when there is sufficient metered data to perform the linear regression analysis.

18. The document processing device of claim 16, wherein the processor is further configured to
store a predicted service event for the second document processing device,
send a notification about the predicted service event to a user associated with the second document processing device, and
receive a response from the service technician in response to the notification,
wherein the user is selected based upon the type of predicted service event.

19. The document processing device of claim 16, wherein the metered data is selected from the group consisting of a printed pages, printed color pages, toner level, and paper cartridge level, and wherein each predicted service event is selected from the group consisting of a low toner event, a low paper event, a scheduled maintenance of a component of the second document processing device, a request to preemptively replace a component of the second document processing device prior to failure of the component, and an inspection request for a component of the second document processing device.

* * * * *